United States Patent
Zeng

(10) Patent No.: US 8,060,914 B2
(45) Date of Patent: Nov. 15, 2011

(54) ANONYMOUS SELECTABLE CREDENTIAL SYSTEM AND METHOD THEREFOR

(75) Inventor: Ke Zeng, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 1086 days.

(21) Appl. No.: 11/860,020

(22) Filed: Sep. 24, 2007

(65) Prior Publication Data
US 2008/0075281 A1    Mar. 27, 2008

(30) Foreign Application Priority Data

Sep. 25, 2006 (CN) .......................... 2006 1 0139475

(51) Int. Cl.
*H04L 9/32* (2006.01)
*H04L 9/00* (2006.01)

(52) U.S. Cl. .......... 726/2; 726/3; 726/4; 726/5; 713/168
(58) Field of Classification Search .................. 726/1–6, 726/17–21; 713/155–157, 168, 193, 175, 713/180; 705/74
See application file for complete search history.

(56) References Cited

U.S. PATENT DOCUMENTS

| | | | |
|---|---|---|---|
| 7,444,644 B1 * | 10/2008 | Slaughter et al. | 719/315 |
| 7,716,492 B1 * | 5/2010 | Saulpaugh et al. | 713/185 |
| 2003/0177352 A1 * | 9/2003 | Camenisch et al. | 713/158 |

FOREIGN PATENT DOCUMENTS

| | | |
|---|---|---|
| JP | 2004-320562 A | 11/2004 |
| WO | 2005/116794 A1 | 12/2005 |

* cited by examiner

*Primary Examiner* — Hosuk Song
(74) *Attorney, Agent, or Firm* — Sughrue Mion, PLLC

(57) ABSTRACT

The present invention provides an anonymous selectable credential system and method therefor. In the system, a credential authority issues root credentials to a user for certain user rights. The user generates an anonymous selectable credential from the root credentials that correspond to a selected set of user rights, and presents the anonymous selectable credential to a service. Using the anonymous selectable credential, the user can prove to the service through a knowledge proof that the selected set of user rights was granted by the credential authority. Then the service may provide service to the user according to the verified user rights. By generating and presenting different anonymous selectable credentials, the user could remain anonymous no matter how many times he/she accessed one or more services. The user can selectively prove any portion of his/her full set of rights, and no matter how many rights is to be proved, the computational cost is basically the same as that for proving only one right.

45 Claims, 7 Drawing Sheets

ANONYMOUS SELECTABLE CREDENTIAL SYSTEM AND METHOD THEREFOR

FIELD OF THE INVENTION

The invention relates generally to communication network security, and more particularly to a communication device, a communication system and methods therefor capable of preserving privacy with anonymous selectable credentials.

BACKGROUND

With the proliferation of smart gadgets, appliances, mobile devices, PDAs and sensors, ubiquitous computing environments may be constructed, which consist of interconnected devices and services, promising seamless integration of digital infrastructure into our everyday lives. The inevitable trend is ever increasing ubiquitous communications as the users have the freedom to choose the access network technologies, applications, and services. There are methods as well that enhance the usage of mobile devices, by making them available throughout the physical environment, and effectively invisible to the users.

Before ubiquitous computing being commercially and widely adopted and deployed, there are several security and privacy challenges it must overcome. Generic security requirements of ubiquitous computing consist of authentication and authorization etc. Authorization simply means the act of determining if a particular right, such as access to some resource, can be granted to the presenter of a particular credential. Logically, authorization is preceded by authentication which is on top of confidentiality, integrity, and non-repudiation. Authentication ensures that a user is who he or she claims to be while authorization allows the user access to various services based on the user's identity.

As a classical research realm, authorization has been well studied in the academia. However, resulted solutions to authorization do not take privacy protection into consideration. For example, traditional authorizations may issue one credential to a user for certain access rights. The user can therefore present this credential to a service so as to use the service according to the rights he/she has been granted. Such kind of authorization solution could raise severe privacy concern in ubiquitous computing environment due to the fact that one credential is presented multiple times to the service and the fact that the rights a user holds have to be presented as a whole to the service.

For example, a traveler roams to a city and tries to enjoy shopping service, hotel service, traffic service, etc., provided by the city's tourism portal. The traveler may pay to the tourism portal for one-day access right on shopping service and hotel service. Suppose the tourism portal issues one credential to the traveler stating that the traveler is authorized to access shopping service and hotel service on Jan. 1, 2006 only. When the traveler presents this credential to the shopping service multiple times, his/her activities could be easily correlated because of the single credential in use and the user's behavior pattern may be modeled. And it will be effortless for the shopping service to learn that the traveler has hotel service right. In any case, these are considered privacy invasion since e.g. advertisement, direct marketing may arise.

As privacy protection is such as important task for ubiquitous computing to address, a desirable privacy respected authorization is expected to satisfy the following requirements.

1) Unlinkable authorized access. It's computationally infeasible for a ubiquitous service, or multiple ubiquitous services together, to correlate activities of its authorized user. In other words, one ubiquitous user could remain anonymous no matter how many times he/she has accessed one or more services that the user is authorized.

2) Selective minimal rights. It's computationally infeasible for a ubiquitous service or multiple ubiquitous services together, to learn any right of an authorized user other than that he/she has presented to the service/services for verification. In other words, for each admitted session, what the service learned is rights of the user that are exactly required by the session. The service can learn neither user rights on the service that are however unnecessary to the session, nor user rights on other services.

It's not hard to imagine a central authorization server that the ubiquitous user as well as the ubiquitous service needs to consult for each access. One of such approach is, for example, proposed by C. Y. Yeun, E. K. Lua, J. Crowcroft, *Security for Emerging Ubiquitous Networks*, IEEE 62$^{nd}$ Vehicular Technology Conference, 2005. By this approach, for each access attempt of a user, the service needs to consult the central authorization server in terms of what rights a user has on the service. Obviously, by this approach user privacy is somehow protected because the user never directly presents his full access rights to the service.

However, with respect to ubiquitous computing, it's not a good idea to ask ubiquitous user as well service to consult central authorization server for each access. Such approach has many problems.

For example, the users will not always have persisted connections to the central point of authorization. Weak network connection is the most advocated reason for this case. Nevertheless, there are other reasons for users not to keep persisted connections to the central point of authorization, be it long round-trip time toward central point of authorization, extra expense in money terms, or additional overhead on battery energy.

In addition, central point of authorization is not able to face the challenge of huge number of ubiquitous users. As aforementioned, if each user only has one authorization credential from the central point of authorization, such authorization credential effectively help the service to correlate activities of the users. Thus, to fulfill requirements on privacy protection, central point of authorization has to be prepared for requests from its huge number of users for each session he/she access a service. Scalability is therefore becoming a severe issue.

There are other solutions that don't need to consult central authorization server for each user access. One solution is Simple Public-Key Infrastructure (SPKI), proposed by IETF as RFC 2693. SPKI can provide authorization certificate that relies upon the uniqueness of the combination of a pseudonym and a public-key. SPKI authorization certificates can authorize actions, give permissions, and grant capabilities to or for a public-key holder. The paper entitled *A First Approach to Provide Anonymity in AttributeCertificates* in Proc. PKC 2004 by V. Benjumea et al. presents another solution for a user to get anonymous attribute certificate so as to anonymously access a service based on the attribute certificate.

However, in terms of SPKI, by which the user and service are free from consulting central server for each access, the certificate authority has to explicitly issue all the authorization certificates for all its users. The same analysis applies to the idea presented by V. Benjumea, because in their scheme, for each pseudonym a user acquires from the trusted third party, there is one and only one attribute certificate being generated. Therefore, to get multiple attribute certificates implies to get multiple pseudonyms from the trusted third party.

SPKI and Benjumea's approach have drawback in that when one certificate is presented to a service more than one times, the user's activities could be easily correlated. Hence, to access a service multiple times without being correlated, the user has to acquire multiple certificates. It's obvious that such schemes could not scale well in large-scale ubiquitous computing environment.

SPKI and Benjumea' approach have another drawback in that roughly speaking, the computational cost for a user to present N attributes is N times larger than that of presenting one attribute. Albeit it's possible to incorporate N attributes in one certificate so as to overcome the computation cost issue. Then, it's impossible for the user to present only a portion of N attributes without revealing the other portion of attributes which is of significant privacy concern.

SUMMARY OF THE INVENTION

The present invention is made in view of the problems in the prior art. The present invention provides an anonymous selectable credential system, a communication device used therein and methods therefor.

According to one aspect of the invention, a communication device for a user to access a service in a communication network is provided, comprising: a root credential acquiring unit, being adapted to acquire one or more root credentials, each one of which is issued for a user right; a right selecting unit, being adapted to select a set of user rights; an anonymous selectable credential generating unit, being adapted to generate one or more anonymous selectable credentials from the root credentials that correspond to the selected set of user rights; a communication unit, being adapted to transmit the anonymous selectable credentials; and a knowledge proving unit, being adapted to perform knowledge proof to anonymously prove via any one of the anonymous selectable credentials that the set of user rights was authorized.

According to another aspect of the invention, a method for a user to access a service in a communication network is provided, comprising: acquiring one or more root credentials, each one of which is issued for a user right; selecting a set of user rights; generating one or more anonymous selectable credentials from the root credentials that respond to the selected set of user rights; transmitting the anonymous selectable credentials; and performing knowledge proof to anonymously prove via any one of the anonymous selectable credentials that the set of user rights was authorized.

According to another aspect of the invention, a communication device for authorizing a user to access a service in a communication network is provided, comprising: an initialization unit, being adapted to set system parameters and publish public parameters; a communication unit, being adapted to receive information on user identity, intended service and intended user rights; and an authorization unit, being adapted to generate root credentials for the user to use in generating one or more anonymous selectable credentials, wherein each root credential corresponds to a user right.

According to another aspect of the invention, a method for authorizing a user to access a service in a communication network, comprising: setting system parameters and publishing public parameters; receiving information on user identity, intended service and intended user rights; and generating root credentials for the user for use in generating one or more anonymous selectable credentials, wherein each root credential corresponds to a user right.

According to another aspect of the invention, a communication device for providing service to authorized users in a communication network is provided, comprising: a communication unit, being adapted to receive information on a set of user rights and an anonymous selectable credential corresponding to the set of user rights; an anonymous selectable credential verification unit, being adapted to verify the anonymous selectable credential to determine whether the set of user rights was authorized; and a service unit, being adapted to provide service to the user according to the verified user rights.

According to another aspect of the invention, a method for providing service to authorized users in a communication network is provided, comprising: receiving information on a set of user rights and an anonymous selectable credential corresponding to the set of user rights; verifying the anonymous selectable credential to determine whether the set of user rights was authorized; and providing service to the user according to the verified user rights.

According to another aspect of the invention, a communication system is provided, comprising at least one credential authority (CA) device, at least one user device and at least one service device coupled via a communication network. The credential authority device comprises an authorization unit adapted to generate root credentials, each one of which corresponds to a user right. The user device comprises a right selecting unit adapted to select a set of user rights; an anonymous selectable credential generating unit adapted to generate one or more anonymous selectable credentials from the root credentials that correspond to the selected set of user rights; and a knowledge proving unit adapted to perform knowledge proof with the service device to anonymously prove via the anonymous selectable credential presented to the service device that the set of user rights was authorized by the credential authority. The service device comprises an anonymous selectable credential verification unit adapted to verify the anonymous selectable credential presented by the user device; and a service unit adapted to provide service to the user device according to the verified user rights.

According to another aspect of the invention, a method for a communication system is provided. The communication system comprises at least one credential authority device, at least one user device and at least one service device coupled via a communication network. The method comprises: the credential authority device generating root credentials, wherein each root credential corresponds to one of user rights; the credential authority device sending the root credentials to the user device; the user device selecting a set of user rights and generating one or more anonymous selectable credentials from the root credentials that correspond to the selected set of user rights; the user device presenting one of the anonymous selectable credentials to the service device; the user device performing knowledge proof with the service device to anonymously prove via the presented anonymous selectable credential that the set of user rights was authorized by the credential authority; and the service device providing service to the user device according to the verified user rights.

According to another aspect of the invention, a manufactured article having a machine readable medium with instructions recorded thereon is provided. The machine readable medium, when executed by one or more processors, causes the processor to acquire one or more root credentials, each one of which is issued for a user right; select a set of user rights; generate one or more anonymous selectable credentials from the root credentials that correspond to the selected set of user rights; transmit anonymous selectable credentials;

and perform knowledge proof to anonymously prove via any one of the anonymous selectable credentials that the set of user rights was authorized.

According to another aspect of the invention, a manufactured article having a machine readable medium with instructions recorded thereon is provided. The machine readable medium, when executed by one or more processors, causes the processor to set system parameters and publish public parameters; receive information on user identity, intended service and intended user rights; and generate root credentials for the user to use in generating one or more anonymous selectable credentials, wherein each root credential corresponds to a user right.

According to another aspect of the invention, a manufactured article having a machine readable medium with instructions recorded thereon is provided. The machine readable medium, when executed by one or more processors, causes the processor to receive information on a set of user rights and an anonymous selectable credential corresponding to the set of user rights; verify the anonymous selectable credential to determine whether the set of user rights was authorized; and provide service to the user according to the verified user rights.

According to the invention, after a user is authorized, without further contacting CA, the user could remain anonymous no matter how many times he/she accessed one or more services that he/she has been authorized by CA. At the same time the number of rights CA can support is not pre-determined. That's to say, CA can support new rights from time to time regardless how many users have been issued what portions of existing rights.

Also, the user can selectively prove any portion of his/her full set of rights, and at the same time, computational cost for the user to prove any portion of his full set of rights is constant, i.e. independent of the number of rights being proved (the same as to prove only one right).

BRIEF DESCRIPTIONS OF THE DRAWINGS

The present invention will be better understood from the following detailed description of the preferred embodiments of the invention, taken in conjunction with the accompanying drawings in which like reference numerals refer to like parts and in which.

DETAILED DESCRIPTION OF THE PREFERRED EMBODIMENTS

The present invention will be described below with reference to the drawings. In the following detailed description, numerous specific details are set forth to provide a full understanding of the present invention. It will be obvious, however, to one ordinarily skilled in the art that the present invention may be put into practice without some of these specific details. In other instances, well-known structures and techniques are not shown in detail so as to avoid unnecessarily obscuring the present invention.

Figure 1:
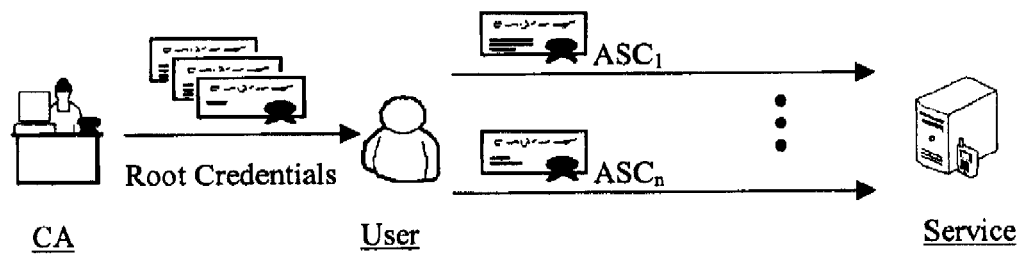
FIG. 1 is a diagram schematically illustrating the general concept of the invention.

The general concept of the invention will be described with reference to FIG. 1. As shown in FIG. 1, in the communication system according to the invention, three parties are involved: CA (Credential Authority), user and service. The device of each party is connected to each other through a communication network. Although only one user and one service are shown, the system may comprise any number of users as well as services. It is also possible that more than one CA exists.

In the communication system, the service offers authorized users a service, such as online audio/video service, game service, file download service, online biding service, online booking service, etc. The service is provided to the user in accordance with his/her certain right. When a user tries to access the service, the service will check the right shown by the user, then function accordingly. For example, if it is determined that the user has no right to access to the service, or the right claimed by the user can not be proved trustworthy, the user may be refused to enjoy the service. In some cases, the service may be in a hierarchical configuration. That is, the level of service, for example, the quality/quantity of the content provided, is determined according to the degree of the user's right.

Generally, the user should be authorized, that is, the user is required to present a credential to the service to prove his/her certain rights. In FIG. 1, CA is shown for issuing credential to the user. As used herein, CA includes any trusted third party that is capable of carrying out an authorization job.

In the communication system according to the invention, CA determines the rights for each user based on his/her identity, and for example in practice based on how much fee the user would like to pay, then grants a basic credential to each user. When the user wants to access a service, he/she does not present directly the basic credential issued by CA to the service. On the contrary, what is presented to the service by the user is a new credential generated from the basic credential issued by CA. The credential presented to the service proves that particular right(s) selected by the user are granted by the CA, without revealing any other right of the user to the service, while allowing the user to keep anonymous to the service.

In order to be distinguished from the credential used in the traditional system, the basic credential issued from CA to the user according to the invention is hereinafter referred to as root credential, and the new credential generated from the root credentials by the user according to the invention is hereinafter referred to as Anonymous Selectable Credential (ASC).

According to the invention, the user may derive from the root credentials a plenty of ASCs ($ASC_1, \ldots ASC_n$) proving the same portion of his/her full set of rights. The user may present different ASCs to different services or the same service for multiple accesses. By ASC, it ensures that, no matter the user presents his rights to the service how many times, the user's accesses can not be correlated by the service or services together, and for all the access attempts of the user, there is no need to contact CA any more.

The exemplary devices and methods according to particular embodiments of the invention will be described in detail with reference to the drawings.

Figure 2:
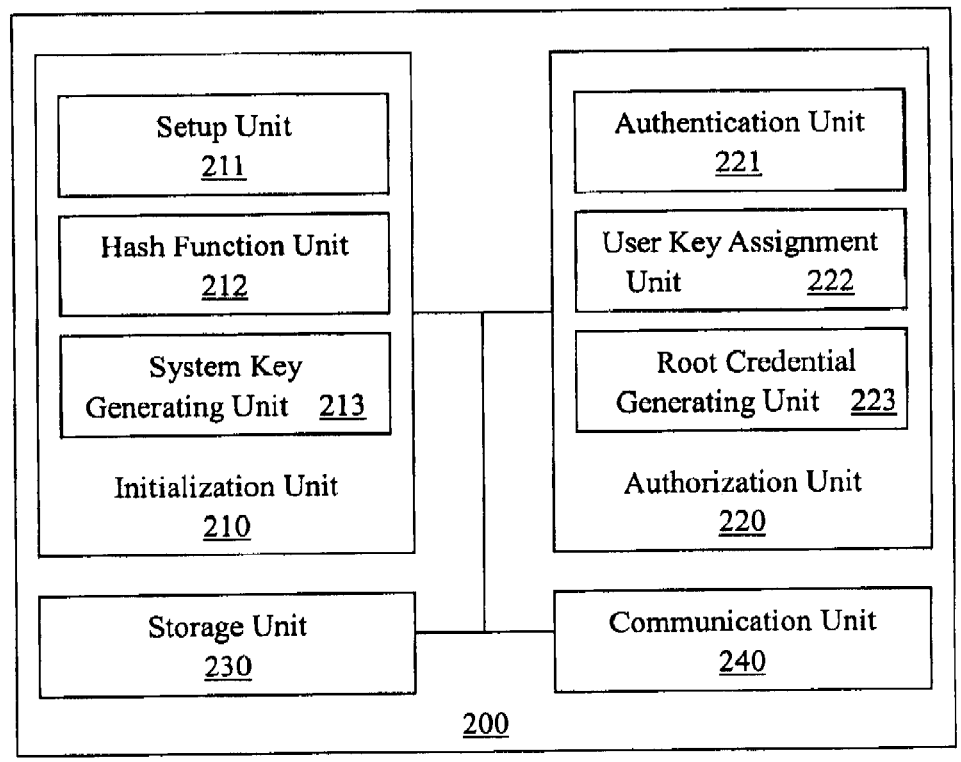
FIG. 2 is a block diagram showing an exemplary configuration of the CA device according to one embodiment of the invention.

FIG. 2 is a block diagram showing an exemplary configuration of the CA device according to one embodiment of the invention.

As shown in FIG. 2, the CA device 200 mainly comprises an initialization unit 210 for setting system parameters, an authorization unit 220 for granting rights to users, a storage unit 230 for keeping various data such as system parameters, user key database and other data used by each unit, and a communication unit 240 for transmitting and receiving data via the communication network.

The initialization unit 210 may further comprise a setup unit 211 for setting up underlying algebra based on a selected security parameter, a hash function unit 212 for determining a secure one-way hash function for use, a system key generating unit 213 for generating private and public keys of CA.

The authorization unit 220 may further comprise an authentication unit 221 for determining whether the user can be authorized, a user key unit assignment 222 for assigning keys for users, and a root credential generating unit 223 for computing root credentials.

Incidentally, CA has ability to authorize users to access certain service(s). That is, CA supports one or more services and still further, one or more rights each service may enable. In some situations, CA and each service come to an agreement. For example, a service entrusts CA with the collection of payments for the use of service and accepts the users authorized by CA. CA may maintain information on the supported services, and for each service, the full set of supported rights. Also, CA may maintain information on the requirements of issuing each right to a user. For example, CA device maintain a table or database storing in association the supported services, the supported rights of each service and the conditions for determining whether a user is able to be granted a certain right. In the embodiment shown in FIG. 2, such information may be stored in the storage unit 230. However, CA device may comprise a separate unit for storing and updating such information. CA may obtain and maintain the authorization ability and necessary information of services and rights through various ways as those in traditional solutions. Since it is not a matter of interest in the present invention, the details thereof are omitted to avoid obscuring the invention.

Figure 3:
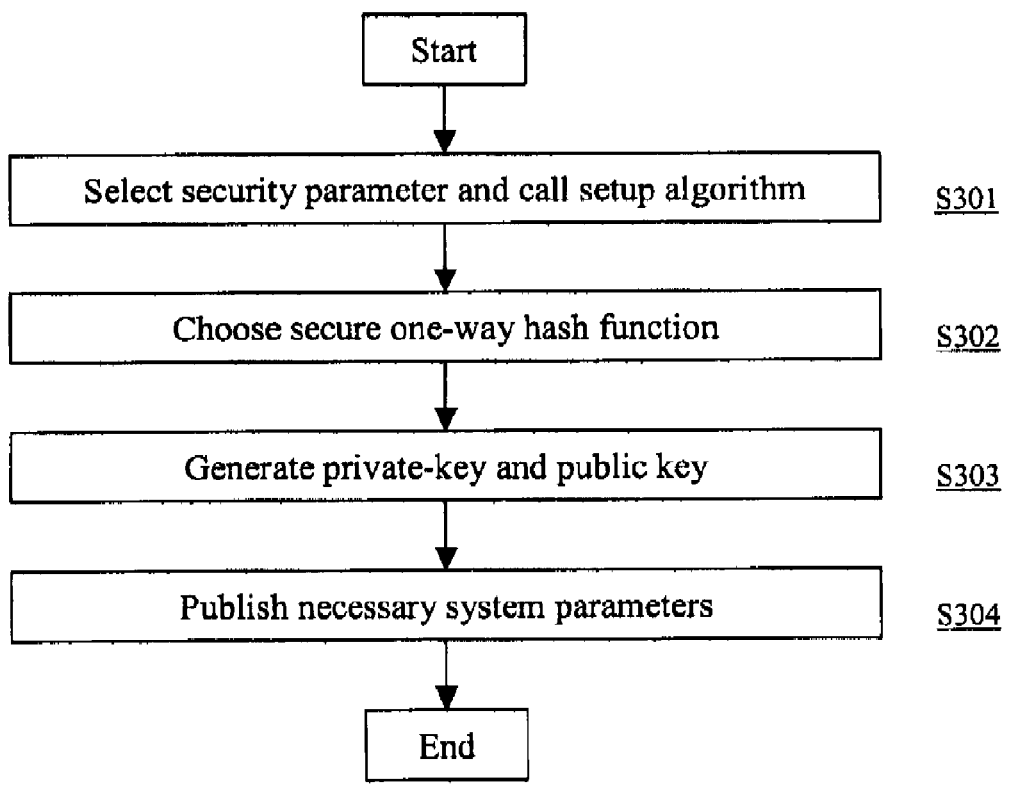
FIG. 3 is a flow chart illustrating an example of CA initialization process according to one embodiment of the invention.

FIG. 3 is a flow chart illustrating an example of CA initialization process according to one embodiment of the invention.

Some definitions are given below. Traditional multiplicative group notation is used in the description as an example. However, those skilled in the art may realize that the additive notation often used in elliptic curve settings can be similarly adopted.

Let $\mathbb{G}_1 = \langle g_1 \rangle$ and $\mathbb{G}_2 = \langle g_2 \rangle$ be two finite cyclic groups with an additional group $g = \langle g \rangle$ such that $|\mathbb{G}_1| = |\mathbb{G}_2| = |g| = p$, where p is some large prime. Bilinear map (see D. Boneh, M. Franklin, *Identity-Based Encryption from the Weil Pairing*, Proc. Ctypto'01, LNCS, vol. 2139, pp. 213~229, 2001; S. Galbraith, K. Harrison, D. Soldera, *Implementing the Tate pairing*, Proc. of the 5$^{th}$ International Symposium on Algorithmic Number Theory, LNCS 2369, 324~337, 2002; and A. Miyaji, M. Nakabayashi, S. Takano, *New Explicit Conditions of Elliptic Curves for FR-reduction*, IEICE Trans. Fundamentals, E84-A(5): 1234~1243, 2001, which are incorporated herein by reference) e: $g_1 \times g_2 \rightarrow g$ is a function, satisfying the following requirements:

i. bilinear—for all $h_1 \in \mathbb{G}_1$, $h_2 \in \mathbb{G}_2$ and for all a, $b \in \mathbb{Z}_p$, $e(h_1^a, h_2^b) = e(h_1, h_2)^{ab}$;

ii. non-degenerate—$\exists h_1 \in \mathbb{G}_1$, $\exists h_2 \in \mathbb{G}_2$, such that $e(h_1, h_2) \neq I$, where I is the identity of $g$; and iii. computable—there exists an efficient algorithm for computing e.

A setup algorithm Setup is defined that on an input security parameter $1^k$, outputs above settings of bilinear map and is wrote as:

$$(p, \mathbb{G}_1, \mathbb{G}_2, g, g_1, g_2, e) \leftarrow \text{Setup}(1^k)$$

where $1^k$ means that the security strength of the system is chose to be k bits.

When the system starts up, CA needs to determine security strength it desires, select underlying algebra, generate its private-key, and publish public-keys. The procedures for the CA device 200 to initialize are described with reference to FIG. 3.

At step S301, the setup unit 211 defines the security parameter according to the security strength it desires and calls the setup algorithm Setup.

At step S302, the hash function unit 212 chooses a secure one-way hash function Hash(.): $\{0,1\}^* \rightarrow \mathbb{G}_1$, which translates an input bit string of arbitrary length to an element of $\mathbb{G}_1$.

At step S303, the system key unit generating 213 chooses an integer $a \in_R \mathbb{Z}_p$ as CA's private-key and computes $A = g_2^a \in \mathbb{G}_2$ as CA's public key.

At step S304, CA publishes necessary public system parameters, in particular, (p, $\mathbb{G}_1$, $\mathbb{G}_2$, $g$, $g_1$, $g_2$, e, A) and the hash function Hash(.).

The parameters and data generated in the initialization process are stored in the storage unit 230 for later use.

Figure 4:
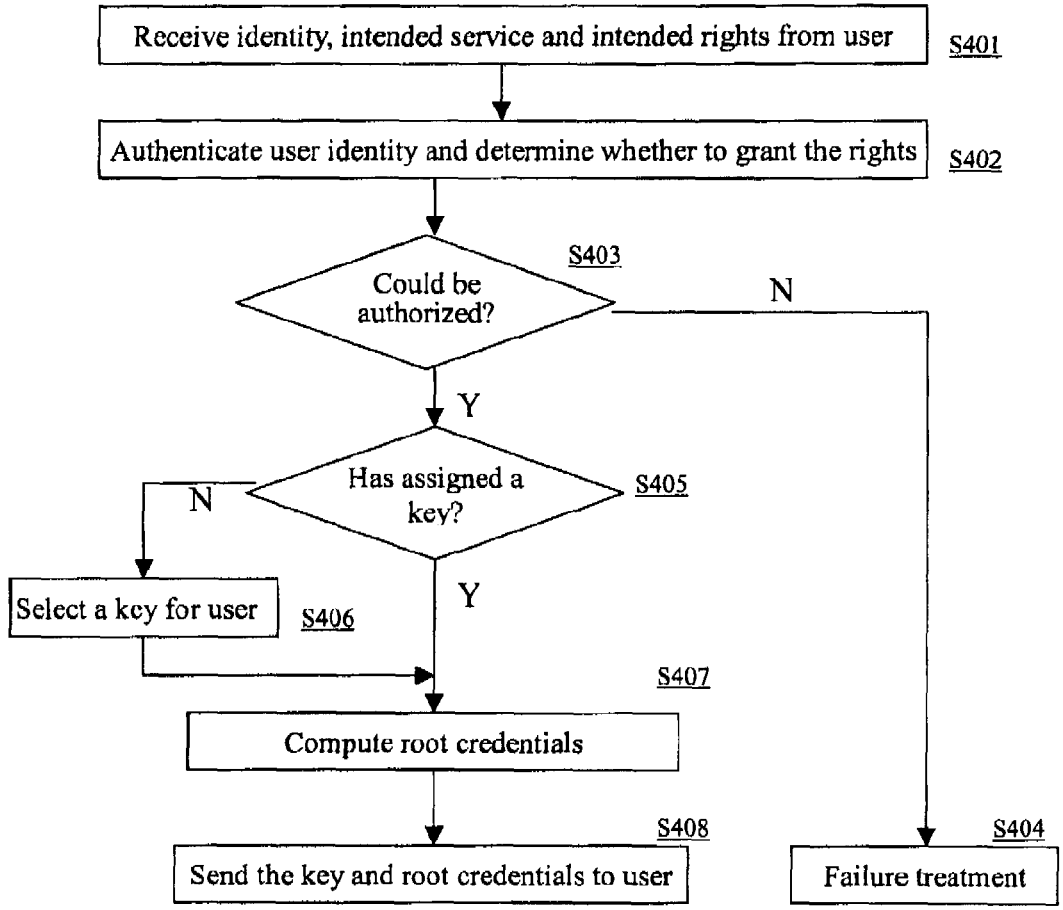
FIG. 4 is a flow char illustrating an example of the authorization process performed by the CA device according to one embodiment of the invention.

The exemplary authorization process performed by the CA device according to one embodiment of the invention is described below with reference to FIG. 4.

Supposing that a user having identity $U_a$ wants to be granted rights $R_i$ (i=1, 2, . . . , γ) for the access to service(s) S, he/she will request CA for authorization by sending his/her identity $U_a$, intended service(s) S, and intended rights $R_i$, i=1, 2, . . . , γ, to CA. It's easy for CA to ascertain that $R_i$ is valid right it supports.

At step S401, the CA device 200 receives the user identity $U_a$, the user intended service(s) S, and the user intended rights $R_i$, i=1, 2, . . . , γ from the user.

At step S402, the authentication unit 221 authenticates the user identity and determines whether to grant the requested rights to the user. The determination may be based on predetermined rules, which, for example, is stored in the storage unit 230. For example, if a preset condition for the certain right, such as a payment to the service, a membership of a specific group, etc, is not satisfied by the user, the user should not be granted the right. Of course, if the intended service or right of the user is not those supported by CA, it is also determined that the user should not be granted the requested right.

If it is determined that the user could not be authorized for the requested rights for some reasons (e.g., CA does not support the service or right requested by the user, the user does not pass the identity authentication or the user does not satisfy the conditions set for the requested rights) at step S403, the process proceeds to step S404. At step S404, the CA device performs failure treatment. For example, the CA device may send a notification indicating a failure authentication as well as the possible reasons to the user, and then ends the process. Alternatively, the CA device may require the user to retransmit the request, and then the process goes back to step S401. The failure treatment may be designed according to a particular application, but is not limited to the above examples.

On the other hand, if it is determined that the user could be authorized for the requested rights at step S403, the process proceeds to step S405. At step S405, the user key assignment unit 222 checks a user key database stored in the storage unit 230 for a user key z of $U_a$. If the user has been assigned a user key, the process goes to step S407.

On the other hand, if the user has not been assigned a user key, the user key unit assignment 222 selects $z \in_r \mathbb{Z}_p$ as the key for $U_a$ at step S406 and stores the assigned key in association with the user identity $U_a$ in the user key database.

Without loss of generality, we assume that $R_i$ is represented by a bit string. Then at step S407, for each requested right $R_i$, root credential generating unit 223 computes root credential $t_i = \text{Hash}(R_i)^{1/(a+z)} \in \mathbb{G}_i$, $i=1, 2, \ldots, \gamma$ for the user. Then at step S408, the CA device sends the key z for $U_a$ and root credentials $t_i$, $i=1, 2, \ldots, \gamma$, to the user.

It's notable that, after a user has selected some rights to be granted by CA, CA can freely add in new rights it can support. In other words, it's possible for CA to support new rights from time to time regardless how many users have been issued what portions of existing rights. A new root credential for an additional right can be issued to the user without any modification of the existing credentials.

Figure 5:
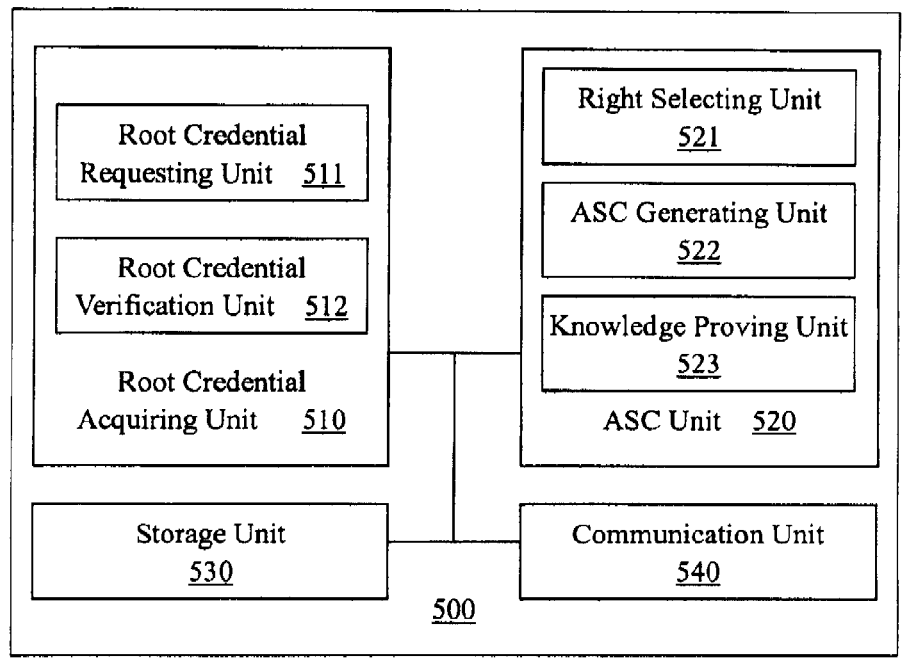
FIG. 5 is a block diagram showing an exemplary configuration of the user device according to one embodiment of the invention.

FIG. 5 is a block diagram showing an exemplary configuration of the user device according to one embodiment of the invention.

As shown in FIG. 5, the user device 500 mainly comprises a root credential acquiring unit 510 for acquiring root credentials from CA, an Anonymous Selectable Credential (ASC) unit 520 for generating and using ASCs, a storage unit 530 for keeping various data such as system parameters, user key, root credentials, ASCs and other data used by each unit, and a communication unit 540 for transmitting and receiving data via the communication network.

The root credential acquiring unit 510 may further comprises a root credential requesting unit 511 for requesting root credentials from CA, and a root credential verification unit 512 for verifying the root credentials received from CA. The ASC unit 520 may further comprises a right selecting unit 521 for determining which subset of rights is to be presented to a service, an ASC generating unit 522 for computing ASCs from the root credentials, and a knowledge proving unit 523 for performing knowledge proof with the service for the verification of the ASC.

Figure 6:
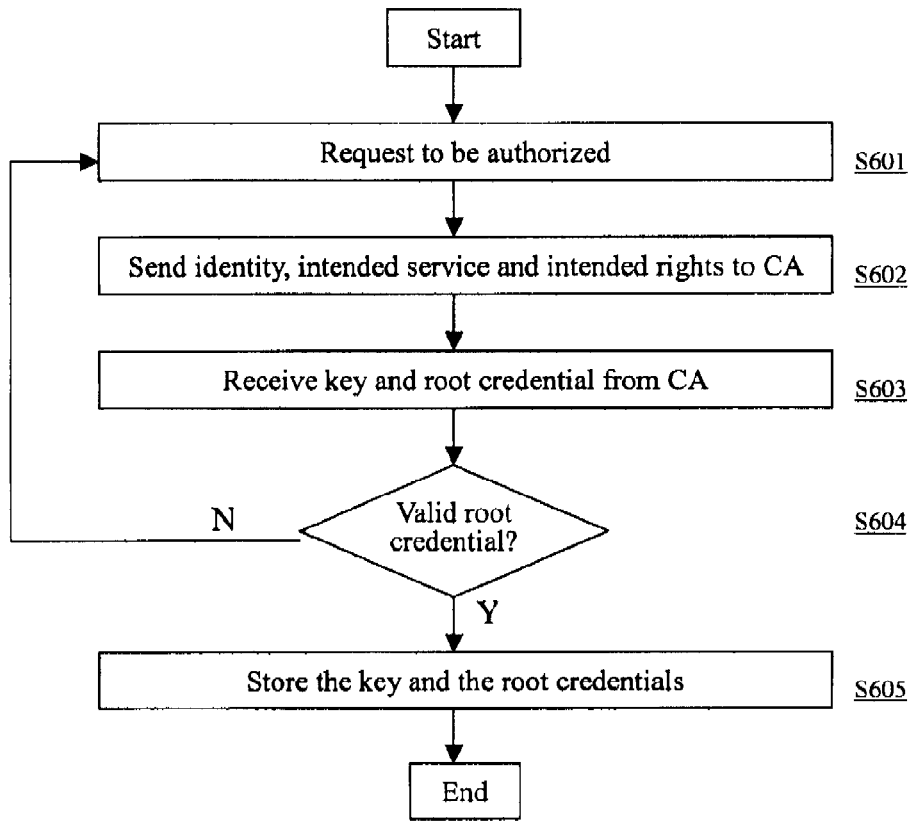
FIG. 6 is a flow chart illustrating an example process for the user device to acquire root credentials from CA according to one embodiment of the invention.

FIG. 6 is a flow chart illustrating an example process for the user device to acquire root credentials from CA according to one embodiment of the invention.

As shown in FIG. 6, at step S601, the root credential requesting unit 511 requests CA for authorizing the user for his/her intended rights. For example, the root credential requesting unit 511 sends a request message through the communication unit 540 to the CA device.

And at step S602, the root credential requesting unit 511 sends the user's identity $U_a$, intended service S, and intended rights $R_i$, $i=1, 2, \ldots, \gamma$, through the communication unit 540 to the CA device. The above data may be sent after the communication unit 540 receives a request acknowledge message from the CA device. Alternatively, they are sent along with the request message. Thus, step S601 could be combined with step S602.

After the user is authorized by CA, the user device 500 receives the user key assigned by CA to $U_a$ and the root credentials issued by CA by the communication unit 540 at step S603.

Then, at step S604, the root credential verification unit 512 verifies the received root credential based on the CA published parameters. In this embodiment, the root credential verification unit 512 computes $h_i = \text{Hash}(R_i) \in \mathbb{G}_1$, and checks whether $e(t_i, A \cdot g_2^z) = e(h_i, g_2)$, $i=1, 2, \ldots, \gamma$. If yes, the assigned user key and the root credentials are stored in the storage unit 530 at step S605 for later use. Otherwise, the process goes back to step S601 to repeat the request. Alternatively, other procedure may be employed to deal with the failure. For example, the root credential verification unit 512 may request the CA device to retransmit the data after an unsuccessful verification.

After obtaining the root credentials form CA, the user device may generates by itself ASCs based on the root credentials, and presents an ASC to a service for proving that the shown rights of the user are granted by CA without reveal the identity and other rights of the user.

Figure 7:
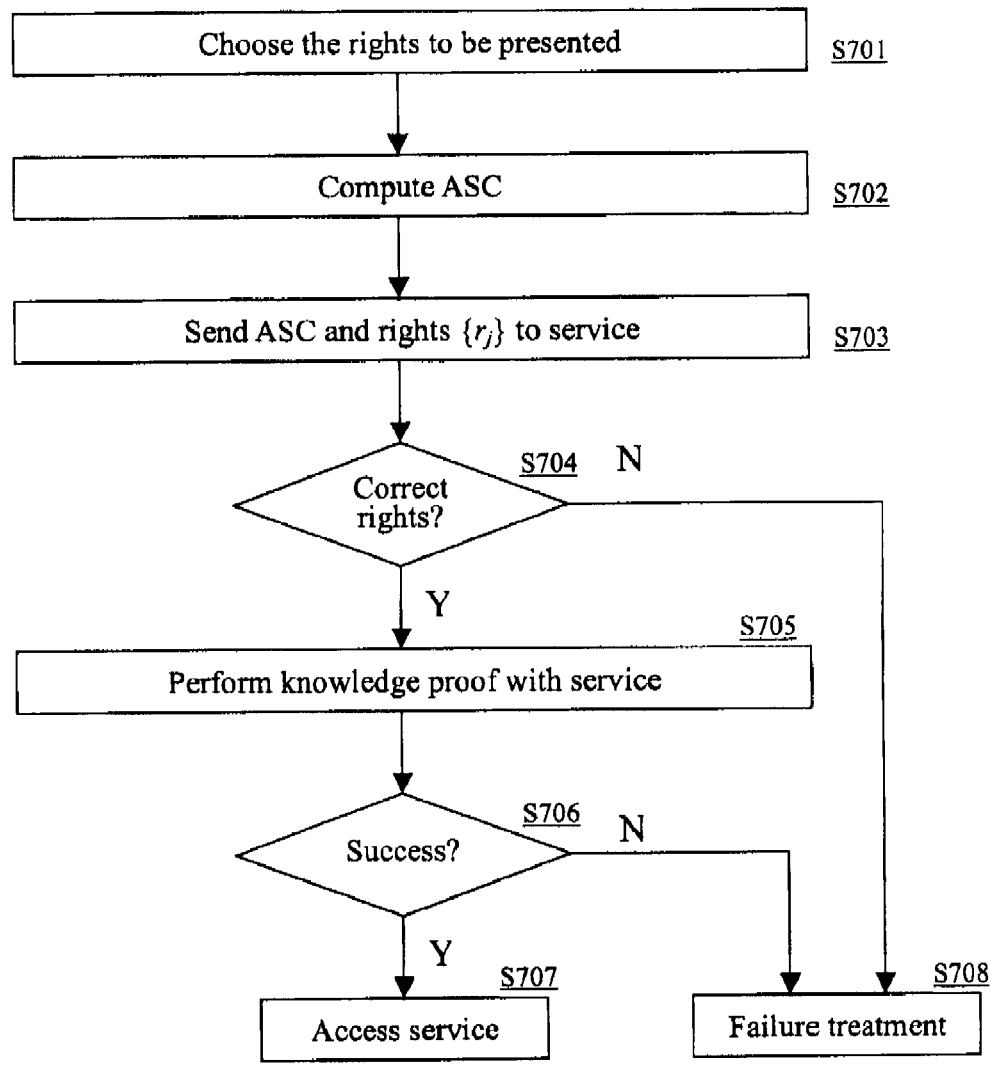
FIG. 7 is a flow chart illustrating an example process for the user device to access a service according to one embodiment of the invention.

FIG. 7 is a flow chart illustrating an example process for the user device to access a service according to one embodiment of the invention.

As shown in FIG. 7, at step S701, the right selecting unit 521 selects a subset of rights $\{r_j\} \subseteq \{R_i\}$, $i=1, 2, \ldots, \gamma$, $j=1, 2, \ldots, N$, $N \leq \gamma$, which is to be presented to the service. The selection may be based on accepted rights advertised by the service for certain context. For example, the service may advertise that: only for that day a discount is applied to VIP user who is with company COMP. In this case, the user may want to identify himself as employee of COMP in addition to VIP user of the service so as to enjoy the special discount. Alternatively, the user may only identify him as VIP user regardless the special discount on that day. The selection may be made according to the input by the user.

At step S702, the ASC generating unit 522 computes the ASC of the selected rights. In particular, let $t_j$ denotes the root credential that corresponds with a right $r_j$. The ASC generating unit 522 selects $\tau \in_r \mathbb{Z}_p$, computes the anonymous selectable credential (ASC)

$$T = \left(\prod_{j=1}^{N} t_j\right)^{\tau} \in \mathbb{G}_1,$$

and computes $$H = \prod_{j=1}^{N} h_j \in \mathbb{G}_1,$$

where $h_j = \text{Hash}(r_j) \in \mathbb{G}_1$, $j=1, 2, \ldots, N$.

At step S703, the user device sends ASC T and the presented rights $\{r_j\}$, $j=1, 2, \ldots, N$, to the service device. Then, the service device will check whether each rights presented by the user device is a correct right that the service supports. If at step S704, the user device is notified that the presented rights are not correct, the process proceeds to the failure treatment at step S708. For example, in the failure treatment, the user device checks and corrects the data, and returns the process to step S703 to resend the data. Alternatively, the user device checks the data and returns the process to step S701 to reselect the rights. Various failure treatment may be designed according to different situations.

On the other hand, if at step S704, the rights presented by the user device is determined as those supported by service, the knowledge proving unit 540 of the user device performs knowledge proof with the service to prove that the presented rights are granted by CA at step S705.

After the ASC is successfully verified through the knowledge proof (S706), the user device can access the service with the presented rights at step S707. If the knowledge proof fails (S706), the process proceeds to the failure treatment at step S708. For example, in the failure treatment, the user device checks and corrects the data, and returns the process to step S703 to resend the data. Alternatively, the user device checks the data and returns the process to step S702 to compute a different ASC. Various failure treatment may be designed according to different situations.

Figure 8:
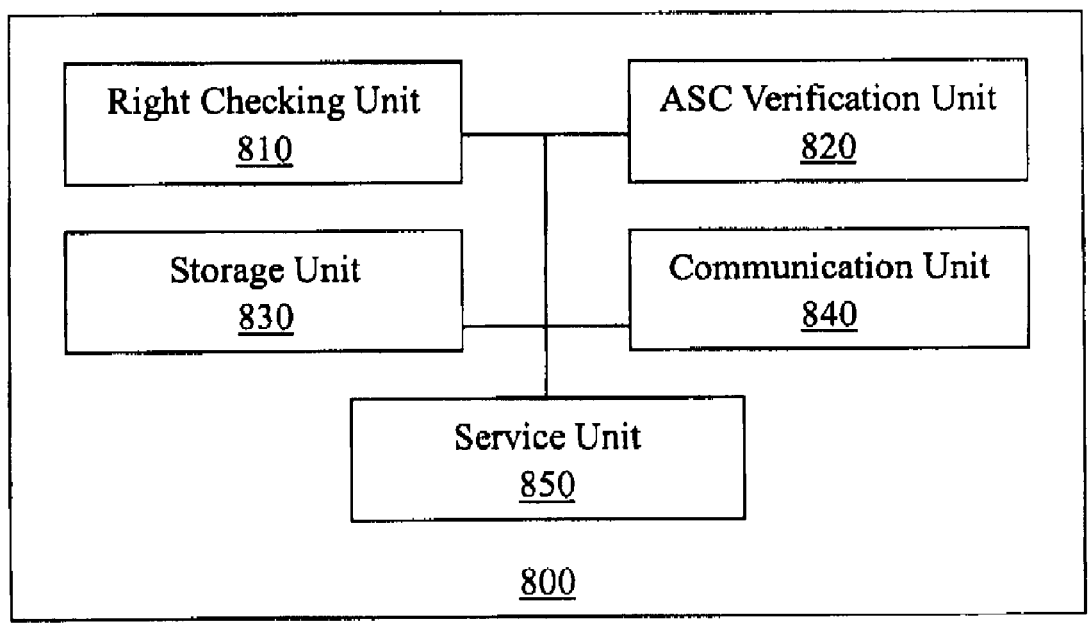
FIG. 8 is a block diagram showing an exemplary configuration of the service device according to one embodiment of the invention.

FIG. 8 is a block diagram showing an exemplary configuration of the service device according to one embodiment of the invention.

As shown in FIG. 8, the service device 800 mainly comprises a right checking unit 810 for checking whether the user presents correct rights, a ASC verification unit 820 for verifying the ASC received from the user, a storage unit 830 for keeping various data such as system parameters, received ASCs and other data used by each unit, a communication unit 840 for transmitting and receiving data via the communication network and a service unit 850 for providing service to users.

Figure 9:
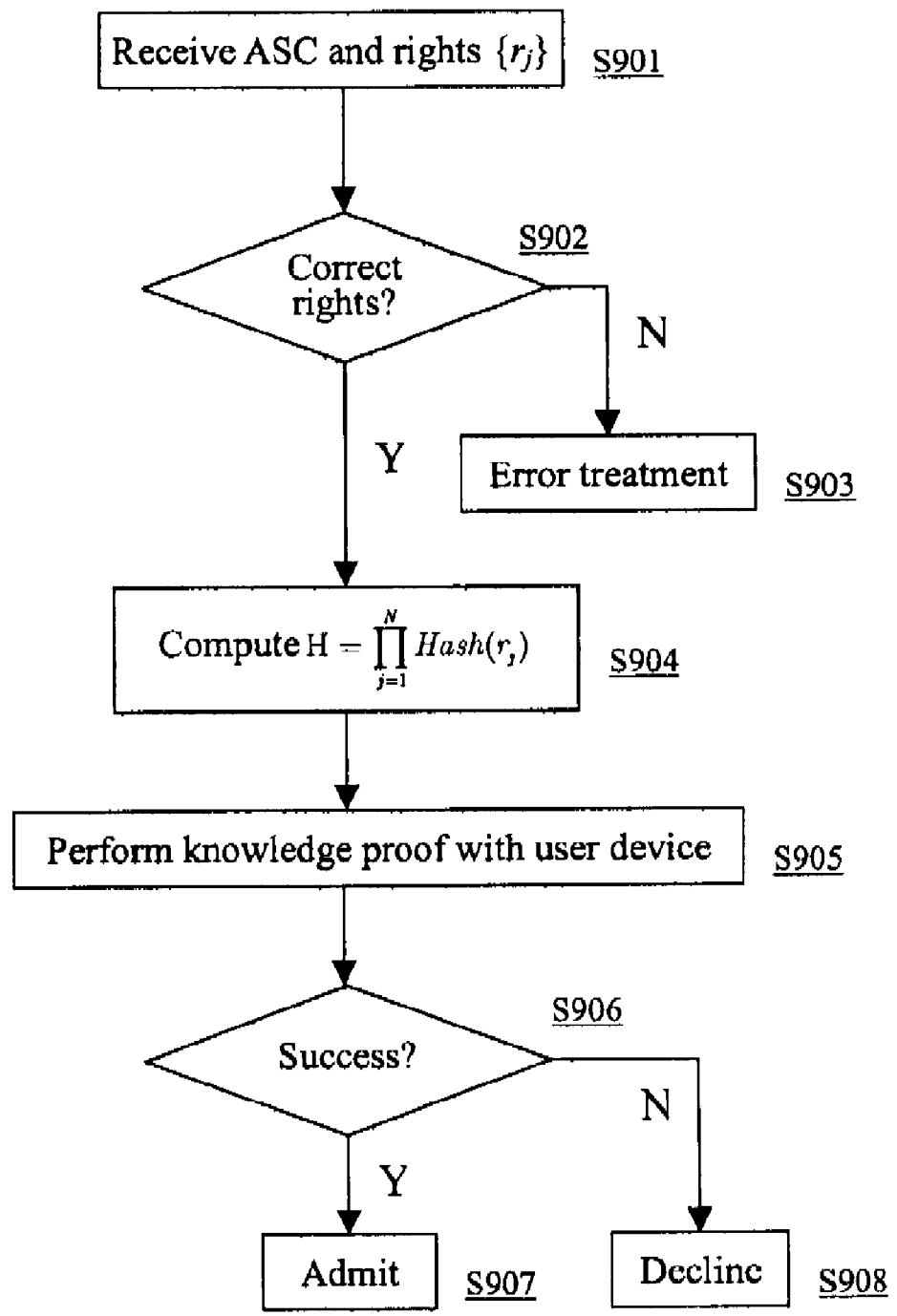
FIG. 9 is a flow chart illustrating an exemplary verification process performed by the service device according to one embodiment of the invention.

FIG. 9 is a flow chart illustrating an exemplary verification process performed by the service device according to one embodiment of the invention.

At first, the service device receives the rights $\{r_j\}$, $j=1, 2, \ldots, N$ presented by the user device and the corresponding ASC T from the user device at step S901.

Then at step S902, the right checking unit 810 of the service device checks that whether the presented rights $\{r_j\}$, $j=1, 2, \ldots, N$, are correct rights that it accepts. If not, the right checking unit 810 performs error treatment at step S903. For example, the service device may send a notification indicating an error as well as the possible reasons to the user device, and then ends the process.

If the rights presented by the user device are correct, the ASC verification unit 820 of the service device computes $$H = \prod_{j=1}^{N} \text{Hash}(r_j) \in \mathbb{G}_1$$

at step S904, and performs knowledge proof with the user device at step S905.

If the ASC is successfully verified through the knowledge proof (S906), the service device admits the user device to the service at step S907, and the service unit 850 of the service device may provide service to the user in accordance with the verified rights of the user. Otherwise, the user is declined at step S908. For example, the service device may send a notification indicating a failure proving and ends the process.

In the above embodiment of the invention, so-called knowledge proof technique is used (see S. Goldwasser, S. Micali, C. Rackoff, *The Knowledge Complexity of Interactive Proof Systems*, 17$^{th}$ ACM Symposium on Theory of Computation, pp. 291~304, 1985, which is incorporated herein as reference). Many methods have been proposed to prove the knowledge of discrete logarithm in zero-knowledge (see A. Fiat, A. Shamir, *How To Prove Yourself: Practical Solutions to Identification and Signature Problems*, Advances in Cryptology—CRYPTO'86, pp. 186~194, 1986; D. Chaum, *Demonstrating Possession of a Discrete Logarithm without Revealing It*, Advances in Cryptology—CRYPTO'86, pp. 200~212, 1987; D. Chaum, J. H. Evertse, J. van de Graaf, *An Improved Protocol for Demonstrating Possession of Discrete Logarithms and Some Generalizations*, Advances in Cryptology—EUROCRYPTO'87, pp. 127~141, 1987; D. Chaum, T. P. Pedersen, *Wallet Databases with Observers*, Advances in Cryptology—CRYPTO'92, pp. 89~105, 1993; K. Sako, J. Kilian, *Receipt-Free Mix-Type Voting Scheme—A Practical Solution to the Implementation of a Voting Booth*, Advances in Cryptology—CRYPTO'98, pp. 393~403, 1998; and Ke Zeng, *Pseudonymous PKI for Ubiquitous Computing*, LNCS 4043, pp. 207-222, EuroPKI'06, 2006 that provides a concrete step by step example on how to compute and realize the knowledge proof procedure, which are incorporated herein as references).

In the above embodiment of the invention, the knowledge proof between the user device and service device may be denoted as $\text{SKP}\{(x_1, x_2): e(T, A)=e(H, g_2)^{x_1} \cdot e(T, g_2^{-1})^{x_2}\}$. In particular, the user device proves to the service device the knowledge of $x_1$ and $x_2$, such that $e(T, A)=e(H, g_2)^{x_1} \cdot e(T, g_2^{-1})^{x_2}$ holds.

Various traditional methods for performing knowledge proof can be employed in the embodiment of the invention. Since they are known in the art, the detailed procedures thereof are not described here. It is obvious for those skilled in the art that both interactive and non-interactive knowledge proof can be employed in the embodiment of the invention. The non-interactive version of knowledge proof may reduce round trip communication between the user device and the service device, and hence is advantageous in terms of network utilization and time consumption. However, it may require that the user device and the service device share the same time origin so as to defend against replay attack. The advantage and drawback of interactive and non-interactive variants are known to those skilled in the art.

As can be seen from above description, according to the invention, by selecting different $\tau \in_R \mathbb{Z}_p$, without CA involvement, the user can generates as many as possible ASC $$T = \left(\prod_{j=1}^{N} t_j\right)^T \in \mathbb{G}_1$$

that can be verified by a service as CA authorized while keeping anonymity of the user to the service. Multiple accesses to the same service by the same user with different ASCs are un-linkable. That's to say, no matter the user presents his/her rights to the service how many times, the user's accesses can not be correlated by the service and for all the access attempts of the user, there is no need to contact CA any more. On the other hand, CA is able to trace the true identity of a user from the user's ASC since it has stored each user key in association with the corresponding user identity. If necessary, user's identity can be traced with help of CA. One skilled in the art can design the procedure for the tracing and revocation. Examples of the technologies for tracing and revocation are provided by D. Boneh, X. Boyen and H. Shacham, *Short Group Signatures*, Proc. Of Crypto'04, pp. 41~55, 2004; and Ke Zeng, *Pseudonymous PKI for Ubiqui-* tous Computing, LNCS 4043, pp. 207-222, EuroPKI'06, 2006, which are incorporated herein by reference.

Moreover, according to the invention, the user rights that correspond to a certain ASC to be verified by the service are freely chosen by the user from the full set of rights issued by CA to him/her. Since the rights being proved are combined in a multiplication form of $$H = \prod_{j=1}^{N} h_j \in \mathbb{G}_1,$$

and note that in modern cryptography, computational cost of multiplication is considered negligible comparing to the cost of exponentiation, it's therefore clear that proving multiple rights is as efficient as proving one right in terms of computational expense.

Some particular embodiments have been described using traditional multiplicative group notation. The solutions adopting the additive notation will be obvious for one skilled in the art from the above description. According to one embodiment of the invention that adopts the additive notation, the anonymous selectable credential is computed as $$T = \tau\left(\sum_{j=1}^{N} t_j\right) \in \mathbb{G}_1$$

and H is computed as $$H = \sum_{j=1}^{N} h_j \in \mathbb{G}_1,$$

while other notations are kept the same as those described above. The same effect is achieved.

However, regardless the notation, the invention can be implemented by adopting the additive group as well as multiplicative group as long as it supports bilinear map. Therefore, the details thereof are omitted. As will be understood by those skilled in the art, in such solution adopting the additive group, the user rights being proved are combined in an addition form, and the computational cost thereof is also considered negligible comparing to the cost of scalar multiplication. Thus, proving multiple rights is as efficient as proving one right in terms of computational expense.

As known to those skilled in the art, in case that $\mathbb{G}_1$ is a finite cyclic group over elliptic curve, each of $h_i = \text{Hash}(R_i) \in \mathbb{G}_1$ and $t_i = \text{Hash}(R_i)^{1/(a+z)} \in \mathbb{G}_1$ is an element of $\mathbb{G}_1$, which is a point on an elliptic curve. And thus, the correspondingly computed $$T = \left(\prod_{j=1}^{N} t_j\right)^T \text{ and } H = \sum_{j=1}^{N} h_j$$

are naturally elements of $\mathbb{G}_1$. Means for mapping a number and/or a bit string to a point on an elliptic curve are known to those skilled in the art (for example, see D. Boneh, M. Franklin, *Identity-Based Encryption from the Weil Pairing*, Proc. Ctypto'01, LNCS, vol. 2139, pp. 213~229, 2001, which is incorporated herein by reference). It's also notable that there are other methods available to map an access right $R_i$ to a point $h_i$ on elliptic curve. For example, a method for implementing the mapping without using Hash function is disclosed by G. Ateniese, J. Camenisch, B. Medeiros, *Untraceable RFID Tags via Insubvertible Encryption*, Proc. 12$^{th}$ ACM Conference on Computer and Communications Security (CCS'05), pp. 92~101, 2005, which is incorporated herein by reference. Any known algorithm can be applied as long as the solution does not depart from the basic spirit of the invention. Although not shown explicitly in the above exemplary embodiments, modifications to particular formulas shown above will become apparent to those skilled in the art once the true spirit of the invention is fully appreciated.

Some particular embodiments according to the invention have been described above with reference to the drawings. However, the invention is not intended to be limited by the particular configurations and processes shown in the drawings. For example, as exemplary configurations of the CA device, the user device and the service device, some units coupled together have been shown in the drawing. However, the components included in each device are not limited to those units described, and the particular configuration may be modified or changed. Each device may further comprise other units, such as a display unit for displaying information to the operator of the device, an input unit for receiving the input of the operator, a controller for controlling the operation of each unit, etc. They are not described in detail since such components are known in the art, and a person skilled in the art would easily consider adding them to the devices described above.

In addition, although different devices are described and shown, they may be combined as one device for enhanced functionality. For example, the user device and the service device could be combined therefore create a new device that is user device in some cases while provide service as well in some other cases. For another example, the user device and the CA device could be combined should the user manages some additional services.

In addition, although the described units are shown in separate blocks in the drawings, any of them may be combined with the others as one component, or be divided into several components. For example, the storage unit may be a single separate component that collectively stores all the data used by each unit. Alternatively, the storage unit may be implemented as several components, each of which is incorporated in a unit for storing data thereof.

The elements of the invention may be implemented in hardware, software, firmware or a combination thereof and utilized in systems, subsystems, components or sub-components thereof. When implemented in software, the elements of the invention are programs or the code segments used to perform the necessary tasks. The program or code segments can be stored in a machine readable medium or transmitted by a data signal embodied in a carrier wave over a transmission medium or communication link. The "machine readable medium" may include any medium that can store or transfer information. Examples of a machine readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The code segments may be downloaded via computer networks such as the Internet, Intranet, etc.

The invention may be embodied in other specific forms without departing from the spirit or essential characteristics thereof. For example, the algorithms described in the specific embodiment can be modified as long as the system architecture does not depart from the basic spirit of the invention. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A communication device for a user to access a service in a communication network, comprising:
    a root credential acquiring unit, being adapted to acquire one or more root credentials, each one of which is issued for a user right;
    a right selecting unit, being adapted to select a set of user rights;
    an anonymous selectable credential generating unit, being adapted to generate one or more anonymous selectable credentials from the root credentials that correspond to the selected set of user rights;
    a communication unit, being adapted to transmit the anonymous selectable credentials; and
    a knowledge proving unit, being adapted to perform knowledge proof to anonymously prove via any one of the anonymous selectable credentials that the set of user rights was authorized,
    wherein the anonymous selectable credential generating unit generates an anonymous selectable credential T corresponding to a selected set of user rights $\{r_j\}$, $j=1, \ldots, N$, as $$T = \left(\prod_{j=1}^{N} t_j\right)^{\tau} \text{ or } T = \tau\left(\sum_{j=1}^{N} t_j\right),$$

where $t_j$ is the root credential corresponding to the user right $r_j$, T is an integer selected from a specific group, and N is an integer equal to the number of the user rights in the selected set.

2. The communication device according to claim 1, wherein the anonymous selectable credential generating unit generates different anonymous selectable credentials corresponding to the same set of user rights by selecting different integers from the specific group.

3. The communication device according to claim 1, wherein the knowledge proving unit performs interactive or non-interactive knowledge proof.

4. The communication device according to claim 1, wherein the set of user rights are combined in a group multiplication or addition form in the proof.

5. The communication device according to claim 1, wherein the root credential acquiring unit comprises:
    a root credential requesting unit adapted to transmit information on user identity, intended service and intended user rights; and
    a root credential verification unit adapted to verify the received root credentials.

6. A method for a user to access a service in a communication network, comprising:
    acquiring one or more mot credentials, each one of which is issued for a user right; selecting a set of user rights;
    generating, by a communication device, one or more anonymous selectable credentials from the root credentials that respond to the selected set of user rights;
    transmitting the anonymous selectable credentials; and
    performing knowledge proof to anonymously prove via any one of the anonymous selectable credentials that the set of user rights was authorized,
    wherein generating one or more anonymous selectable credentials comprises generating an anonymous selectable credential T corresponding to a selected set of user rights $\{r_j\}$, $j=1, \ldots, N$, as $$T = \left(\prod_{j=1}^{N} t_j\right)^{T} \text{ or } T = \tau\left(\sum_{j=1}^{N} t_j\right),$$

where $t_j$ is the root credential corresponding to the user right $r_j$, T is an integer selected from a specific group, and N is an integer equal to the number of the user rights in the selected set.

7. The method according to claim 6, wherein generating one or more anonymous selectable credentials comprises generating different anonymous selectable credentials corresponding to the same set of user rights by selecting different integers from the specific group.

8. The method according to claim 6, wherein performing knowledge proof comprises performing interactive or non-interactive knowledge proof.

9. The method according to claim 6, wherein the set of user rights are combined in a group multiplication or addition form in the proof.

10. The method according to claim 6, wherein acquiring one or more root credentials
    comprises transmitting information on user identity, intended service and intended user rights and verifying the received root credentials.

11. A communication device for authorizing a user to access a service in a communication network, comprising:
    an initialization unit, being adapted to set system parameters and publish public parameters;
    a communication unit, being adapted to receive information on user identity, intended service and intended user rights; and
    an authorization unit, being adapted to generate root credentials for the user to use in generating one or more anonymous selectable credentials, wherein each root credential corresponds to a user right,
    wherein the authorization unit comprises:
        a user key assignment unit adapted to assign a user key to the user;
        a root credential generating unit adapted to generate root credentials based on the user key, and
    wherein the root credential generating unit generates a root credential t corresponding to a user right R as $t = \text{Hash}(R)^{1/a+z}$, where a is a private key of the communication device and z is the user key.

12. The communication device according to claim 11, wherein the root credential generating unit maps a user right R to a point h on an elliptic curve, and generates a root credential t corresponding to the user right R as $t = h^{1/a+z}$, where a is a private key of the communication device and z is the user key.

13. The communication device according to claim 11, wherein the authorization unit further comprises an authentication unit for determining whether the user can be authorized based on the user identity.

14. The communication device according to claim 11, wherein the initialization unit comprises:
- a setup unit adapted to set a bilinear map based on an input security parameter; a hash function unit adapted to select a secure hash function; and
- a system key generating unit adapted to generate private and public keys for the communication device.

15. A method for authorizing a user to access a service in a communication network, comprising:
- setting system parameters and publishing public parameters;
- receiving, by a communication device, information on user identity, intended service and intended user rights; and
- generating root credentials for the user for use in generating one or more anonymous selectable credentials, wherein each root credential corresponds to a user right,
- wherein generating root credentials further comprises assigning a user key to the user and generating the root credentials based on the user key, and
- wherein generating the root credentials comprises generating a root credential t corresponding to a user right R as t=Hash(R)$^{1/a+z}$, where a is a system private key and z is the user key.

16. The method according to claim 15, wherein generating the root credentials comprises mapping a user right R to a point h on an elliptic curve, and generating a root credential t corresponding to the user right R as t=h$^{1/a+z}$, where a is a private key of the communication device and z is the user key.

17. The method according to claim 15, further comprising determining whether the user can be authorized based on the user identity before generating root credentials.

18. The method according to claim 15, wherein setting system parameters comprises:
- setting a bilinear map based on an input security parameter;
- selecting a secure hash function; and
- generating system private and public keys.

19. A communication device for providing service to authorized users in a communication network, comprising:
- a communication unit, being adapted to receive information on a set of user rights and an anonymous selectable credential corresponding to the set of user rights;
- an anonymous selectable credential verification unit, being adapted to verify the anonymous selectable credential to determine whether the set of user rights was authorized; and
- a service unit, being adapted to provide service to the user according to the verified user rights,
- wherein the anonymous selectable credential T corresponds to the set of user rights $\{r_j\}$, j=1, ..., N, as $$T = \left(\prod_{j=1}^{N} t_j\right)^T \text{ or } T = \tau\left(\sum_{j=1}^{N} t_j\right),$$

where $t_j$ is the root credential corresponding to the user right $r_j$, T is an integer selected from a specific group, and N is an integer equal to the number of the user rights in the set.

20. The communication device according to claim 19, wherein the anonymous selectable credential verification unit performs interactive or non-interactive knowledge proof.

21. The communication device according to claim 19, wherein the set of user rights is combined in a group multiplication or addition form in the verification.

22. The communication device according to claim 19, further comprising a right checking unit adapted to check whether each user right is acceptable.

23. A method for providing service to authorized users in a communication network, comprising:
- receiving information on a set of user rights and an anonymous selectable credential corresponding to the set of user rights;
- verifying, by a communication device, the anonymous selectable credential to determine whether the set of user rights was authorized; and
- providing service to the user according to the verified user rights,
- wherein the anonymous selectable credential T corresponds to the set of user rights $\{r_j\}$, j=1, ..., N, as $$T = \left(\prod_{j=1}^{N} t_j\right)^T \text{ or } T = \tau\left(\sum_{j=1}^{N} t_j\right),$$

where $t_j$ is the root credential corresponding to the user right $r_j$, T is an integer selected from a specific group, and N is an integer equal to the number of the user rights in the set.

24. The method according to claim 23, wherein verifying the anonymous selectable credential comprises performing interactive or non-interactive knowledge proof.

25. The method according to claim 23, wherein the set of user rights is combined in a group multiplication or addition form in the verification.

26. The method according to claim 23, further comprising checking whether each user right is acceptable before verifying the anonymous selectable credential.

27. A communication system comprising at least one credential authority device, at least one user device and at least one service device coupled via a communication network, wherein
- the credential authority device comprises an authorization unit adapted to generate root credentials, each one of which corresponds to a user right;
- the user device comprises a right selecting unit adapted to select a set of user rights; an anonymous selectable credential generating unit adapted to generate one or more anonymous selectable credentials from the root credentials that correspond to the selected set of user rights; and a knowledge proving unit adapted to perform knowledge proof with the service device to anonymously prove via the anonymous selectable credential presented to the service device that the set of user rights was authorized by the credential authority; and
- the service device comprises an anonymous selectable credential verification unit adapted to verify the anonymous selectable credential presented by the user device; and a service unit adapted to provide service to the user device according to the verified user rights,
- wherein the credential authority device generates a root credential t corresponding to a user right R as t=Hash(R)$^{1/a+z}$, where a is a private key of the credential authority device and z is a user key assigned to the user by the credential authority device.

28. The communication system according to claim 27, wherein the credential authority device maps a user right R to a point h on an elliptic curve, and generates a root credential t corresponding to the user right R as t=h$^{1/a+z}$, where a is a private key of the communication device and z is the user key.

29. The communication system according to claim 27 or 28, wherein the anonymous selectable credential generating unit generates a anonymous selectable credential T corresponding to a selected set of user rights $\{r_j\}$, j=1, ..., N, as $$T = \left(\prod_{j=1}^{N} t_j\right)^T \text{ or } T = \tau\left(\sum_{j=1}^{N} t_j\right),$$

where $t_j$ is the root credential corresponding to the user right $r_j$, T is an integer selected from a specific group, and N is an integer equal to the number of the user rights in the selected set.

30. The communication system according to claim 29, wherein the anonymous selectable credential generating unit generates different anonymous selectable credentials corresponding to the same set of user rights by selecting different integers from the specific group.

31. The communication system according to claim 27, wherein the knowledge proving unit performs interactive or non-interactive knowledge proof with the service device.

32. The communication system according to claim 27, wherein the set of user rights are combined in a group multiplication or addition form in the verification.

33. A method for a communication system comprising at least one credential authority device, at least one user device and at least one service device coupled via a communication network, the method comprising:
  the credential authority device generating root credentials, wherein each root credential corresponds to one of user rights;
  the credential authority device sending the root credentials to the user device;
  the user device selecting a set of user rights and generating one or more anonymous selectable credentials from the root credentials that correspond to the selected set of user rights;
  the user device presenting one of the anonymous selectable credentials to the service device;
  the user device performing knowledge proof with the service device to anonymously 20 prove via the presented anonymous selectable credential that the set of user rights was authorized by the credential authority; and
  the service device providing service to the user device according to the verified user rights,
  wherein generating root credentials comprises generating a root credential t corresponding to a user right R as $t=\text{Hash}(R)^{1/a+z}$, where a is a private key of the credential authority device and z is a user key assigned to the user by the credential authority device.

34. The method according to claim 33, wherein generating root credentials comprises mapping a user right R to a point h on an elliptic curve, and generating a root credential t corresponding to the user right R as $t=h^{1/a+Z}$, where a is a private key of the communication device and z is the user key.

35. The method according to claim 33 or 34, wherein generating one or more anonymous selectable credentials comprises generating a anonymous selectable credential T corresponding to a selected set of user rights $\{r_j\}$, j=1, ..., N, as $$T = \left(\prod_{j=1}^{N} t_j\right)^T \text{ or } T = \tau\left(\sum_{j=1}^{N} t_j\right),$$

where $t_j$ is the root credential corresponding to the user right $r_j$, T is an integer selected from a specific group, and N is an integer equal to the number of the user rights in the selected set.

36. The method according to claim 35, wherein generating one or more anonymous selectable credentials comprises generating different anonymous selectable credentials corresponding to the same set of user rights by selecting different integers from the specific group.

37. The method according to claim 33, wherein performing knowledge proof comprises performing interactive or non-interactive knowledge proof.

38. The method according to claim 33, wherein the set of user rights are combined in a group multiplication or addition form in the verification.

39. A manufactured article having a non-transitory computer readable medium with instructions recorded thereon which, when executed by one or more processors, causes the processor to:
  acquire one or more root credentials, each one of which is issued for a user right;
  select a set of user rights;
  generate one or more anonymous selectable credentials from the root credentials that correspond to the selected set of user rights;
  transmit anonymous selectable credentials; and
  perform knowledge proof to anonymously prove via any one of the anonymous selectable credentials that the set of user rights was authorized,
  wherein the one or more anonymous selectable credentials T correspond to the selected set of user rights $\{r_j\}$, j=1, ..., N, as $$T = \left(\prod_{j=1}^{N} t_j\right)^T \text{ or } T = \tau\left(\sum_{j=1}^{N} t_j\right),$$

where $t_j$ is the root credential corresponding to the user right $r_j$, T is an integer selected from a specific group, and N is an integer equal to the number of the user rights in the selected set.

40. A manufactured article having a non-transitory computer readable medium with instructions recorded thereon which, when executed by one or more processors, causes the processor to: set system parameters and publish public parameters;
  receive information on user identity, intended service and intended user rights; and
  generate root credentials for the user to use in generating one or more anonymous selectable credentials, wherein each root credential corresponds to a user right,
  wherein the one or more anonymous selectable credentials T correspond to a set of user rights $\{r_j\}$, j=1, ..., N, as $$T = \left(\prod_{j=1}^{N} t_j\right)^T \text{ or } T = \tau\left(\sum_{j=1}^{N} t_j\right),$$

where $t_j$ is the root credential corresponding to the user right $r_j$ T is an integer selected from a specific group, and N is an integer equal to the number of the user rights in the set.

41. A manufactured article having a non-transitory computer readable medium with instructions recorded thereon which, when executed by one or more processors, causes the processor to:
receive information on a set of user rights and an anonymous selectable credential corresponding to the set of user rights;
verify the anonymous selectable credential to determine whether the set of user rights was authorized; and
provide service to the user according to the verified user rights,
wherein the anonymous selectable credential T corresponds to the set of user rights $\{r_j\}$, $j=1, \ldots, N$, as $$T = \left(\prod_{j=1}^{N} t_j\right)^\tau \text{ or } T = \tau\left(\sum_{j=1}^{N} t_j\right),$$

where $t_j$ is the root credential corresponding to the user right $r_j$ T is an integer selected from a specific group, and N is an integer equal to the number of the user rights in the set.

42. A communication device for authorizing a user to access a service in a communication network, comprising:
an initialization unit, being adapted to set system parameters and publish public parameters;
a communication unit, being adapted to receive information on user identity, intended service and intended user rights; and
an authorization unit, being adapted to generate root credentials for the user to use in generating one or more anonymous selectable credentials, wherein each root credential corresponds to a user right,
wherein the authorization unit comprises:
a user key assignment unit adapted to assign a user key to the user;
a root credential generating unit adapted to generate root credentials based on the user key, and
wherein the root credential generating unit maps a user right R to a point h on an elliptic curve, and generates a root credential t corresponding to the user right R as $t=h^{1/a+z}$, where a is a private key of the communication device and z is the user key.

43. A method for authorizing a user to access a service in a communication network, comprising:
setting system parameters and publishing public parameters;
receiving, by a communication device, information on user identity, intended service and intended user rights; and
generating root credentials for the user for use in generating one or more anonymous selectable credentials, wherein each root credential corresponds to a user right,
wherein generating the mot credentials further comprises assigning a user key to the user and generating the root credentials based on the user key, and wherein generating the root credentials comprises mapping a user right R to a point h on an elliptic curve, and generating a root credential t corresponding to the user right R as $t=h^{1/a+z}$, where a is a private key of the communication device and z is the user key.

44. A communication system comprising at least one credential authority device, at least one user device and at least one service device coupled via a communication network, wherein
the credential authority device comprises an authorization unit adapted to generate root credentials, each one of which corresponds to a user right;
the user device comprises a right selecting unit adapted to select a set of user rights; an anonymous selectable credential generating unit adapted to generate one or more anonymous selectable credentials from the root credentials that correspond to the selected set of user rights; and a knowledge proving unit adapted to perform knowledge proof with the service device to anonymously prove via the anonymous selectable credential presented to the service device that the set of user rights was authorized by the credential authority; and
the service device comprises an anonymous selectable credential verification unit adapted to verify the anonymous selectable credential presented by the user device; and a service unit adapted to provide service to the user device according to the verified user rights,
wherein the credential authority device maps a user right R to a point h on an elliptic curve, and generates a root credential t corresponding to the user right R as $t=h^{1/a+z}$, where a is a private key of the communication device and z is the user key.

45. A method for a communication system comprising at least one credential authority device, at least one user device and at least one service device coupled via a communication network, the method comprising:
the credential authority device generating root credentials, wherein each root credential corresponds to one of user rights;
the credential authority device sending the root credentials to the user device;
the user device selecting a set of user rights and generating one or more anonymous selectable credentials from the root credentials that correspond to the selected set of user rights;
the user device presenting one of the anonymous selectable credentials to the service device;
the user device performing knowledge proof with the service device to anonymously 20 prove via the presented anonymous selectable credential that the set of user rights was authorized by the credential authority; and
the service device providing service to the user device according to the verified user rights,
wherein generating root credentials comprises mapping a user right R to a point h on an elliptic curve, and generating a root credential t corresponding to the user right R as $t=h^{1/a+z}$, where a is a private key of the communication device and z is the user key.

* * * * *

UNITED STATES PATENT AND TRADEMARK OFFICE
CERTIFICATE OF CORRECTION

PATENT NO. : 8,060,914 B2
APPLICATION NO. : 11/860020
DATED : November 15, 2011
INVENTOR(S) : Ke Zeng It is certified that error appears in the above-identified patent and that said Letters Patent is hereby corrected as shown below:

In the Specification

Column 9, Line 23: Delete "$t_i=Hash(R_i)^{1(a+z)}$" and insert -- $t_i=Hash(R_i)^{1/(a+z)}$ --

Column 10, Line 46: Delete "$T = \left(\prod_{j=1}^{N} l_j\right)^T \in \mathbb{C}_1,$" and insert -- $T = \left(\prod_{j=1}^{N} t_j\right)^T \in \mathbb{C}_1,$ --

In the Claims

Column 15, Line 62: In Claim 6, delete "mot" and insert -- root --

Column 16, Line 10: In Claim 6, delete "$T = \left(\prod_{j=1}^{N} l_j\right)^T \text{ or } T = \tau\left(\sum_{j=1}^{N} l_j\right),$" and insert -- $T = \left(\prod_{j=1}^{N} t_j\right)^T \text{ or } T = \tau\left(\sum_{j=1}^{N} t_j\right),$ --

Column 17, Line 23: In Claim 15, delete "$t=Hash(R)^{1/a^+z}$," and insert -- $t=Hash(R)^{1/a+z}$, --

Signed and Sealed this
Thirtieth Day of September, 2014

Michelle K. Lee
*Deputy Director of the United States Patent and Trademark Office*

CERTIFICATE OF CORRECTION (continued)
U.S. Pat. No. 8,060,914 B2

Column 19, Line 6: In Claim 29, delete "$T = \left(\prod_{j=1}^{N} t_j\right)^T \text{ or } T = \tau\left(\sum_{j=1}^{N} t_j\right),$" and insert -- $T = \left(\prod_{j=1}^{N} t_j\right)^T \text{ or } T = \tau\left(\sum_{j=1}^{N} t_j\right),$ --

Column 19, Line 47: In Claim 33, delete "20 prove" and insert -- prove --